United States Patent
Koonar

(10) Patent No.: US 7,438,696 B2
(45) Date of Patent: Oct. 21, 2008

(54) PHYSICAL THERAPY PLATFORM ASSEMBLY

(75) Inventor: Sohan S. Koonar, Windsor (CA)

(73) Assignee: Netmedia Services, Inc., Windsor (CA)

( * ) Notice: Subject to any disclaimer, the term of this patent is extended or adjusted under 35 U.S.C. 154(b) by 387 days.

(21) Appl. No.: 11/122,168

(22) Filed: May 4, 2005

(65) Prior Publication Data
US 2006/0253053 A1 Nov. 9, 2006

(51) Int. Cl.
*A61H 1/00* (2006.01)
(52) U.S. Cl. .............................. 601/46; 601/49; 601/98
(58) Field of Classification Search ............. 601/48–49, 601/51, 61–62, 84, 89, 97, 98, 100, 101, 601/104, 46
See application file for complete search history.

(56) References Cited

U.S. PATENT DOCUMENTS

| | | | |
|---|---|---|---|
| 5,112,045 A | 5/1992 | Mason et al. | |
| 5,277,584 A * | 1/1994 | DeGroat et al. | 434/29 |
| 5,376,065 A * | 12/1994 | McLeod et al. | 601/98 |
| 5,441,466 A | 8/1995 | Piaget et al. | |
| 5,484,388 A * | 1/1996 | Bassett et al. | 601/27 |
| 5,921,899 A | 7/1999 | Rose | |
| 6,375,147 B1 * | 4/2002 | Radziun et al. | 248/638 |
| 6,620,117 B1 * | 9/2003 | Johnson et al. | 601/90 |
| 6,923,773 B2 | 8/2005 | Leivseth et al. | |
| 2005/0131319 A1 | 6/2005 | der Meer | |

FOREIGN PATENT DOCUMENTS

| | | |
|---|---|---|
| DE | 4225564 | 1/1994 |
| WO | WO-2004/096112 | 11/2004 |
| WO | WO-2005/067860 | 7/2005 |

* cited by examiner

*Primary Examiner*—Michael A. Brown
(74) *Attorney, Agent, or Firm*—Gifford, Krass, Sprinkle, Anderson & Citkowski, P.C.

(57) ABSTRACT

A physical therapy vibratory table having a base and a platform disposed above the base and attached to the base by at least one inflatable bladder. A source of pressurized compressible fluid is fluidly connected through a pressure regulator to the bladder while a vibratory motor is attached to the platform. A circuit controls the inflation of the bladder so that the platform is maintained at the same distance relative to the base despite the magnitude of the load imposed on the platform.

8 Claims, 2 Drawing Sheets

PHYSICAL THERAPY PLATFORM ASSEMBLY

BACKGROUND OF THE INVENTION

I. Field of the Invention

The present invention relates generally to physical therapy devices and, more particularly, to a physical therapy vibratory table.

II. Description of Related Art

It is well known that during extended periods of inactivity, muscle atrophies and loses its muscle tone. As a result, after extended periods of inactivity, such muscles become very weak and require physical therapy in order to regain the muscle tone and muscle strength.

For example, it is known that astronauts who spend extended periods of time in outer space lose muscle tone throughout their body due to the loss of gravity while in space. In order to prevent, or at least lessen, muscle atrophy, a physical therapy vibratory table has been previously developed. This previously known physical therapy vibratory platform assembly typically comprised a base with the platform disposed above the base and mounted to the base by rubber bushings. A vibratory motor is attached to the platform so that, upon activation of the motor, the motor vibrates the platform at one or more vibratory speeds.

In practice, the person is supported in full, or in part, upon the vibratory platform assembly, the vibrations from the vibratory table cause the muscles to contract in response to that vibration. In doing so, both muscle strength and muscle tone is maintained.

Obese persons also suffer from muscle atrophy and loss of muscle tone and muscle strength due to inactivity and lack of physical exercise. However, in order to achieve the desired weight reduction, it is necessary for such obese people to rebuild their muscle tone and muscle strength so that they may be able to engage in physical exercise.

The previously known vibratory platform assemblies, however, have not proven effective in rebuilding muscle strength and muscle tone for such obese people. In particular, the weight of some obese people is so high that, once the obese person stands on the platform, the rubber bushings between the base and the platform are compressed which dampens and effectively eliminates the vibrations of the platform even upon activation of the vibratory motor.

SUMMARY OF THE INVENTION

The present invention provides a physical therapy vibratory platform assembly which overcomes all of the above-mentioned disadvantages of the previously known devices. In brief, the vibratory platform assembly of the present invention comprises a base and a platform disposed above the base. At least one, and preferably several inflatable bladders are positioned between and connected to both the base and the platform such that the inflatable bladders support the platform above the base.

A source of pressurized compressible fluid, such as air, is fluidly connected through a pressure regulator to each of the inflatable bladders. After a weight load is positioned upon the platform, e.g. by an obese person stepping upon the platform, a circuit activates the pressure regulator to inflate the inflatable bladders by an amount proportional to the weight load. In practice, a circuit controls the pressure regulator to inflate the bladders by a pressure sufficient to maintain a substantially constant distance between the platform and the base and/or spring rate of the bladders after the weight load is imposed upon the platform. In doing so, upon activation of the vibratory motor, the vibratory motor vibrates the platform in the desired fashion, thus achieving the desired strength and tone of the muscles for the obese person.

BRIEF DESCRIPTION OF THE DRAWING

A better understanding of the present invention will be had upon reference to the following detailed description, when read in conjunction with the accompanying drawings wherein like reference characters refer to like parts throughout the several views, and in which.

DETAILED DESCRIPTION OF A PREFERRED EMBODIMENT OF THE PRESENT INVENTION

Figure 1:
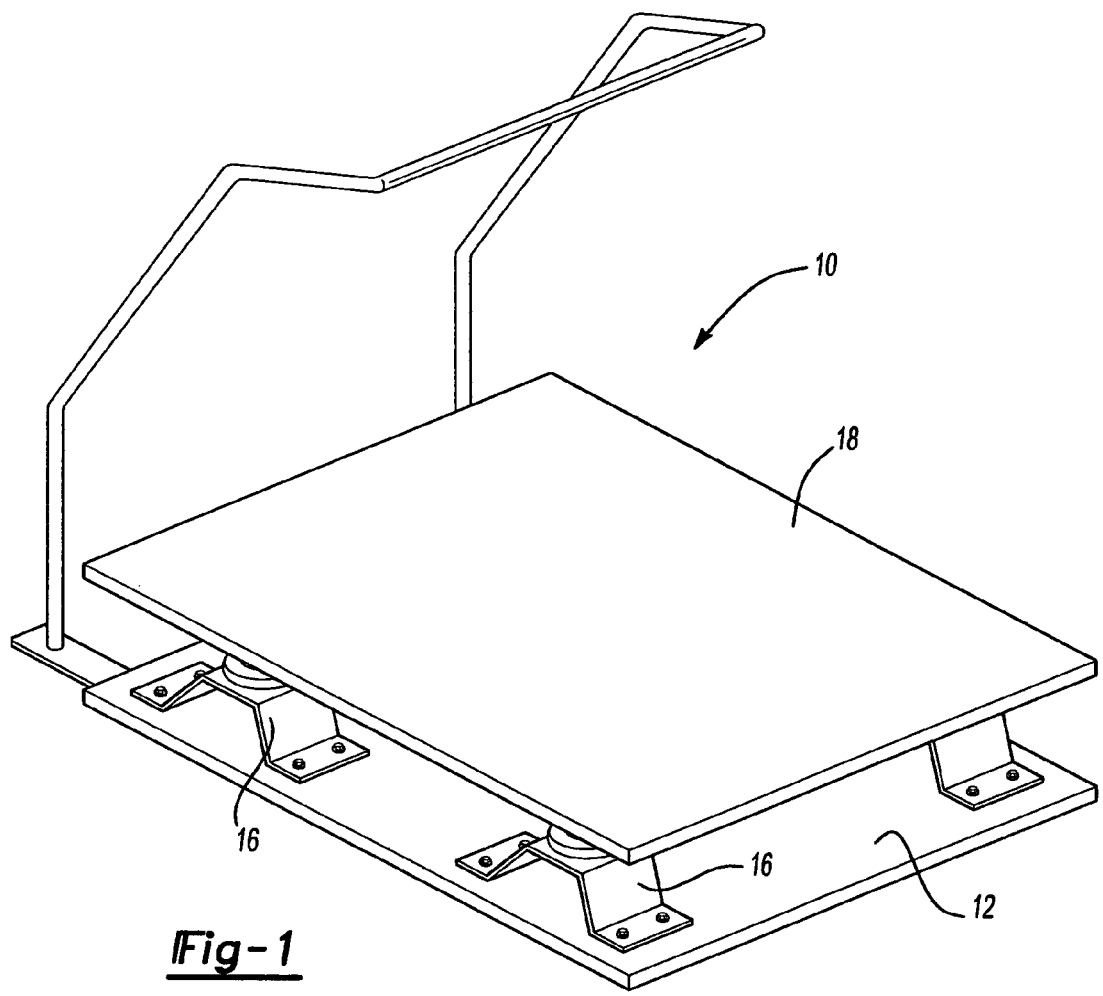
FIG. 1 is a perspective view illustrating a preferred embodiment of the present invention.
Figure 2:
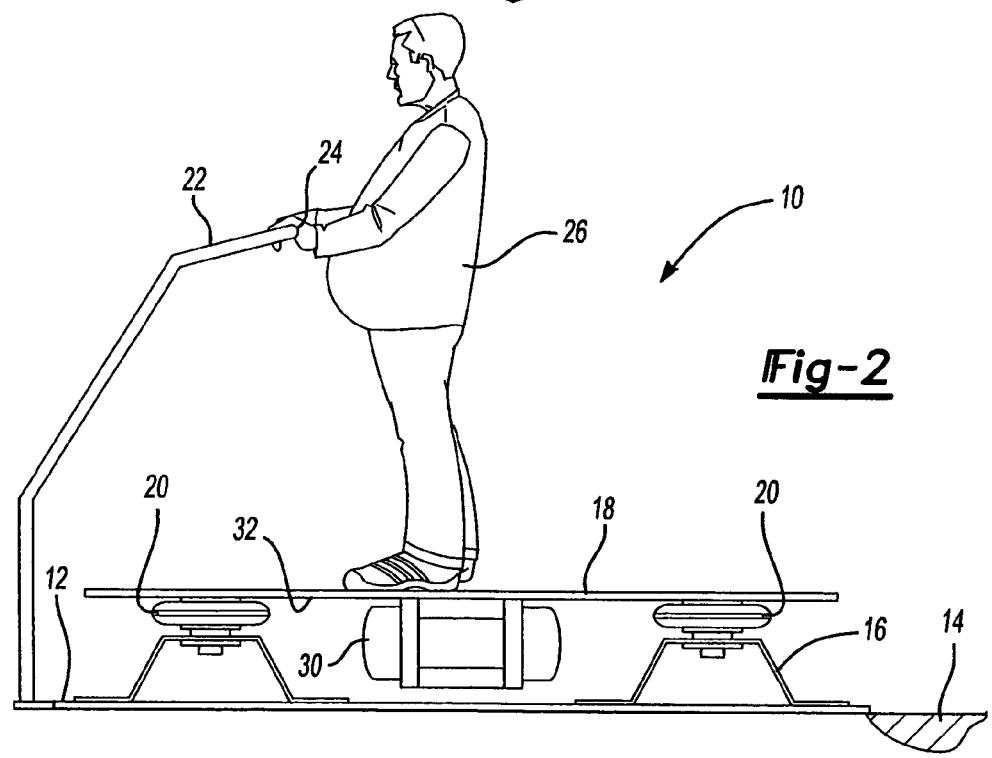
FIG. 2 is a side view illustrating the preferred embodiment of the present invention.

With reference first to FIGS. 1 and 2, a preferred embodiment of the physical therapy vibratory platform 10 of the present invention is shown and comprises a planar and generally rectangular base 12 which is mounted on a ground support surface 14. At least one, and preferably several, brackets 16 are mounted to the top of the base 12. Preferably, one bracket 16 is mounted adjacent each corner of the base 12.

A generally rectangular platform 18 is disposed above the base 12 such that the platform 18 overlies the top of the base 12 and also overlies each of the brackets 16. The platform 18, furthermore, is of a sufficiently rigid construction such that the platform 18 only minimally deflects, if at all, in response to a weight load imposed on top of the platform 18 of the magnitude that could be expected from an obese person standing on top of the platform 18.

Figure 3:
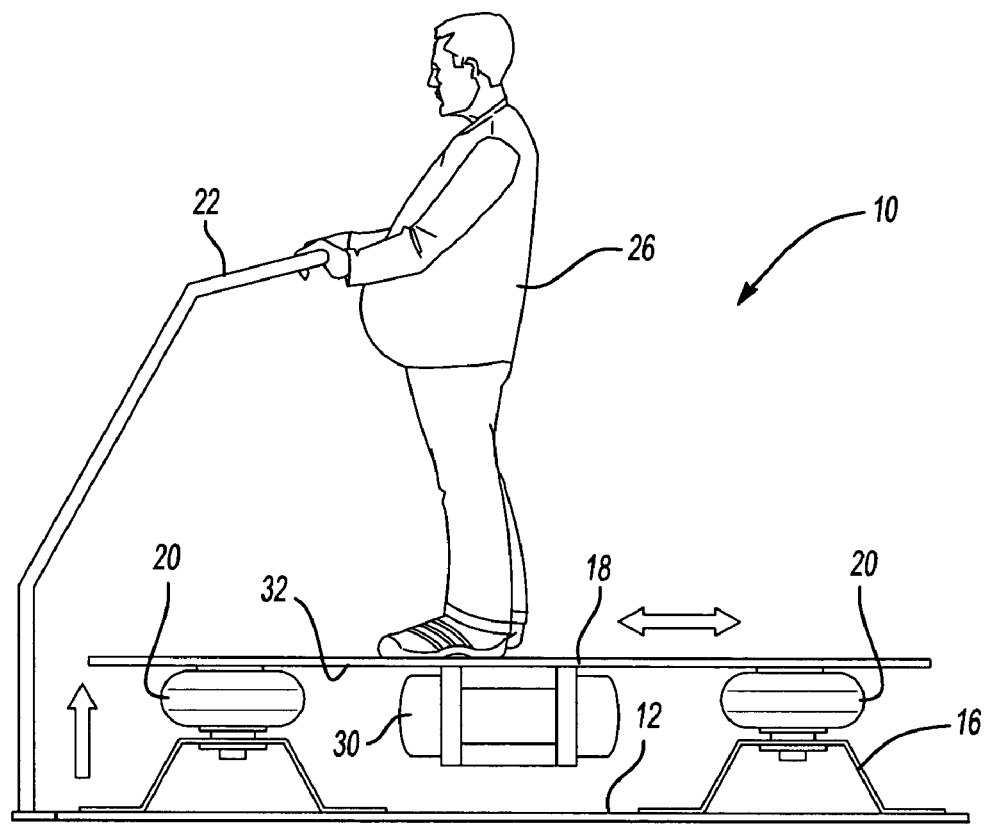
FIG. 3 is a view similar to FIG. 2, illustrating the operation of the present invention when a weight load is positioned on the platform.

With reference now to FIGS. 2 and 3, at least one, and preferably several inflatable bladders 20 are disposed between and connected to both the platform 18 and the base 12. Preferably, one inflatable bladder 20 is positioned in between the bottom of the platform 18 and the top of each bracket 16 of the base 12.

A hand grip 22 preferably has its lower end secured to the base 12 while its upper end 24 is positioned above the platform 18 at a height so that it may be conveniently grasped by a person 26 standing on the platform 18, as shown in FIG. 3. A hand grip 22 may be of any conventional construction and is provided for safety reasons.

Still referring to FIGS. 2 and 3, at least one vibratory motor 30 is mounted to the bottom 32 of the platform 18 so that, upon activation of the vibratory motor 30, the motor 30 causes the platform 18 to vibrate relative to the base 12. Such vibration preferably occurs in the vertical direction, but may also or alternately occur in the horizontal direction.

Any conventional vibratory motor may be utilized to vibrate the platform 18. For example, once such vibratory motor is disclosed in German Patent No. DE 422 5 564 C1, which was published on Jan. 13, 1994.

Figure 4:
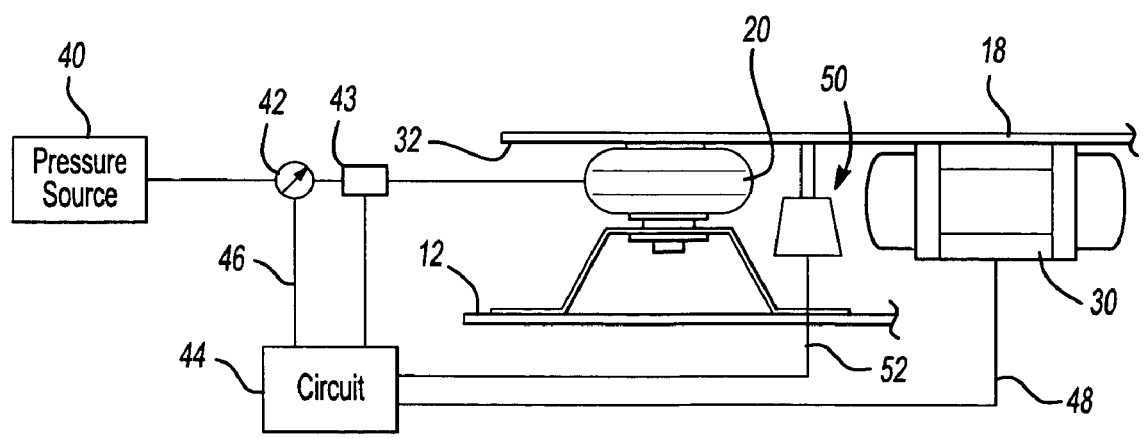
FIG. 4 is a fragmentary block diagrammatic view illustrating the preferred embodiment of the present invention.

With reference now particularly to FIG. 4, a source 40 of a pressurized compressible fluid, such as air, is fluidly connected through a pressure regulator 42 to each of the inflatable bladders 20. A control circuit 44 controls the operation of the pressure regulator 42 through a control line 46 to vary the pressure within the bladder 20 in a fashion to be subsequently described.

The circuit 44 also controls the operation of the vibratory motor 30 through a control line 48. Preferably, the vibratory motor 30 is a variable speed vibratory motor which, through control by the circuit 44, varies the vibration frequency of the motor 30.

A position transducer 50 is operationally coupled between the bottom 32 of the platform 18 and the base 12. The position transducer 50 provides a signal on its output line 52 to the circuit 44 indicative of the relative position of the platform 18 relative to the base 12.

A pressure transducer 43 measures the pressure in the bladders 20. The pressure transducer 43 provides an output signal indicative of this pressure to the circuit 44.

With reference now to FIGS. 2–4, when the person 26 first steps on the platform 18, the inflatable bladders 20 compress in response to the weight load as illustrated diagrammatically in FIG. 2. Thereafter, the circuit 44 generates a signal through the control line 46 to the pressure regulator 42 to inflate the bladders 20. In practice, the circuit 44, in response to the signal from the position transducer 50, pressurizes the inflatable bladders 20 to an amount necessary to maintain a substantially constant spacing between the platform 18 regardless of the magnitude of the weight load imposed on the platform 18. Furthermore, by maintaining the substantially constant spacing between the platform 18 and base 12, the vibratory motor 30 is able to maintain the desired vibration of the platform 18 regardless of the weight load.

Alternatively, the pressure signal from the pressure transducer 43 is utilized by the circuit 44 to control the inflation of the bladders 20 to maintain the spring rate of the bladders 20. In this case the circuit calculates the pressure differential between a no load condition on the platform 18 and the pressure when the load is applied. The circuit 44 then controls the regulator 42 to inflate the bladders 20 to the load pressure plus the calculated pressure differential. For example, assuming a no load pressure of 5 psi and a load pressure of 9 psi, the circuit 44 then inflates the bladders to a pressure of 13 psi (load pressure of 9 psi plus the pressure difference of 4 psi) to maintain the bladder spring rate.

If the bladder pressure transducer 43 is utilized by the circuit 44 to control the inflation of the bladders 20, the position transducer 50 is optionally still utilized by the circuit as a fail safe measure, i.e. the position of the platform 18 must be within a predefined minimum and maximum range.

From the foregoing, it can be seen that the present invention provides a simple and yet highly effective physical therapy vibratory table which is particularly effective for use by obese persons. Such obese persons are able to regain their muscle strength and muscle tone by merely standing on the vibratory table 10. Furthermore, once the muscle strength and muscle tone has been regained, the obese person is able to engage in physical activities and hopefully able to obtain the desired weight loss.

Having described my invention, however, many modifications thereto will become apparent to those skilled in the art to which pertains, without deviation from the spirit of the invention, as defined by the scope of the appended claims.

I claim:

1. A physical therapy vibratory platform assembly comprising:
   a base,
   a platform disposed above said base,
   a plurality of inflatable bladders positioned between and connected to both said base and said platform, said plurality of bladders forming the sole support of said base above said platform,
   a source of pressurized compressible fluid,
   a pressure regulator fluidly connected in series between said fluid source and said at least one bladder,
   a vibratory motor attached to said platform.

2. The invention as defined in claim 1 wherein said platform is generally rectangular in shape and wherein one of said inflatable bladders is positioned adjacent each corner of said platform.

3. The invention as defined in claim 1 and comprising a circuit for controlling said pressure regulator so that the distance between said base and said platform remains substantially constant regardless of the load imposed on said platform.

4. The invention as defined in claim 3 wherein said circuit comprises a position transducer operative disposed between said platform and said base.

5. The invention as defined in claim 1 and comprising motor control circuit for varying the speed of said vibratory motor.

6. The invention as defined in claim 1 and comprising a circuit for controlling said pressure regulator to maintain the spring rate of said bladder.

7. The invention as defined in claim 6 wherein said circuit comprises a pressure transducer which measures the pressure of said bladder.

8. The invention as defined in claim 7 wherein said circuit increases the pressure of said bladder by an amount substantially equal to the pressure difference between a no load and load condition on the platform plus the pressure under said load condition.

* * * * *

UNITED STATES PATENT AND TRADEMARK OFFICE
CERTIFICATE OF CORRECTION

PATENT NO. : 7,438,696 B2  
APPLICATION NO. : 11/122168  
DATED : October 21, 2008  
INVENTOR(S) : Sohan S. Koonar Page 1 of 1

It is certified that error appears in the above-identified patent and that said Letters Patent is hereby corrected as shown below:

In the Claims

At column 4, claim number 1, line number 18, the word base should be the word <u>platform</u>.

At column 4, claim number 1, line number 19, the word platform should be the word <u>base</u>.

Signed and Sealed this  
Twenty-sixth Day of November, 2013

Margaret A. Focarino  
*Commissioner for Patents of the United States Patent and Trademark Office*